UNITED STATES PATENT OFFICE.

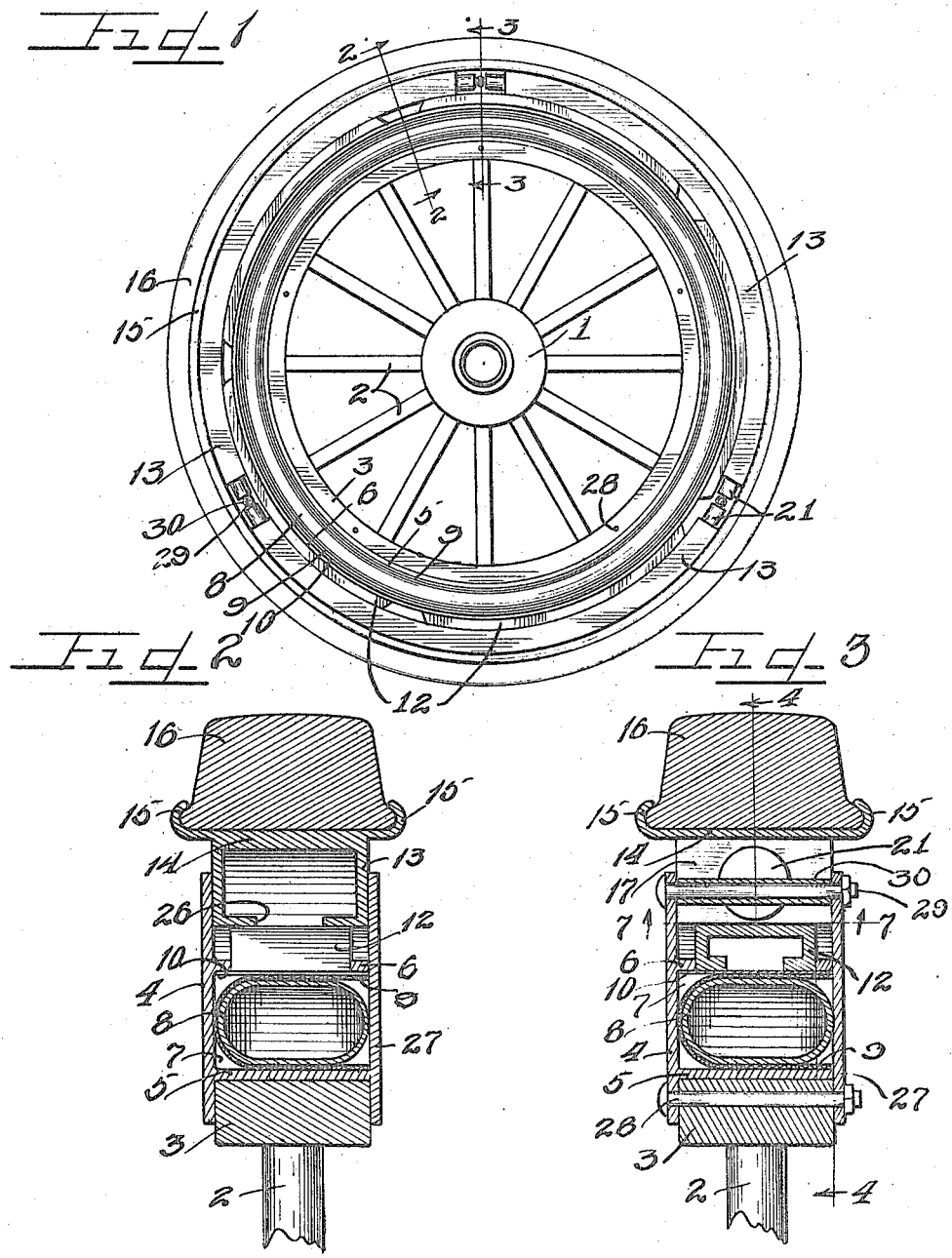

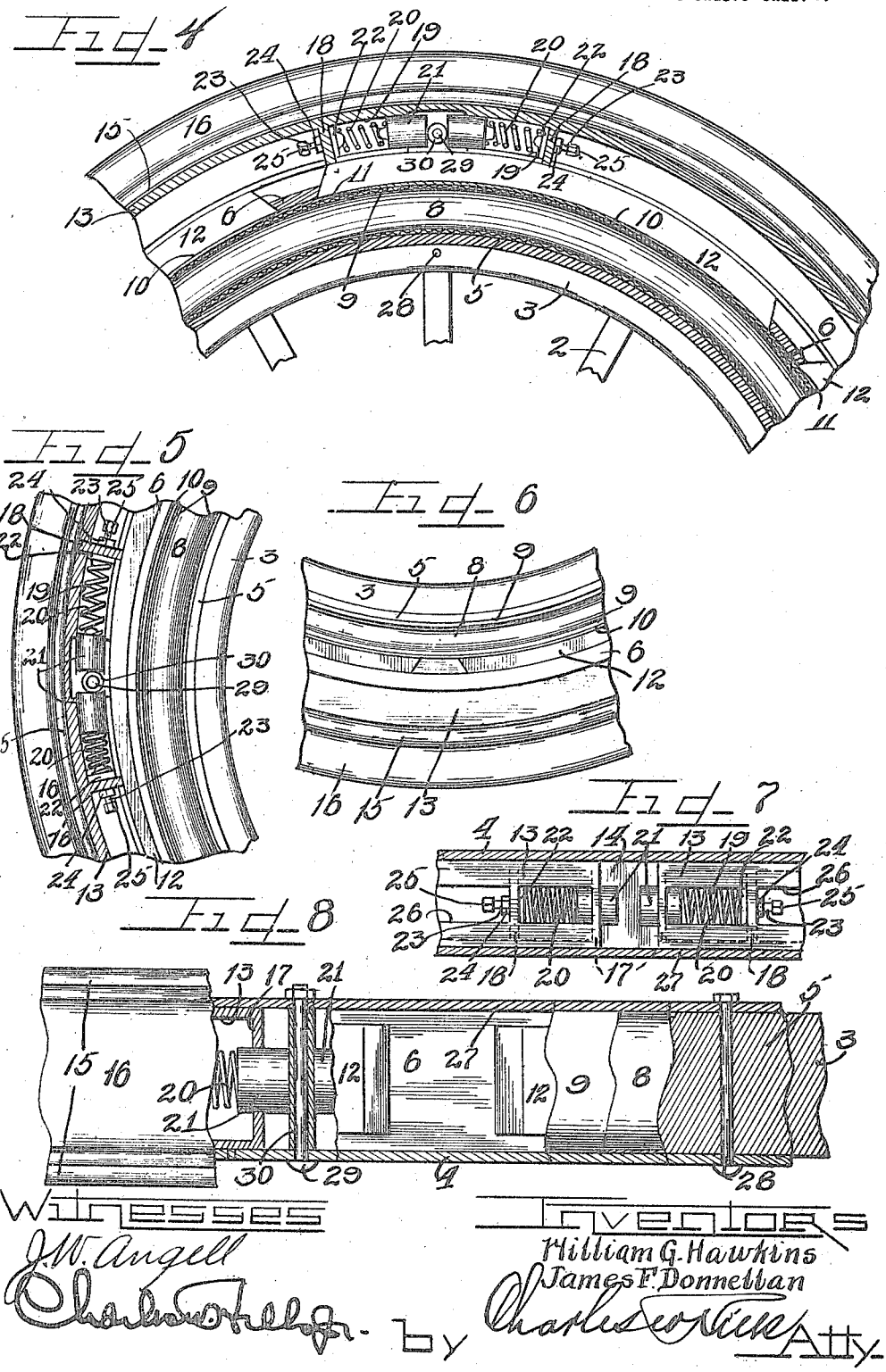

WILLIAM G. HAWKINS AND JAMES F. DONNELLAN, OF CHICAGO, ILLINOIS.

ARMORED PNEUMATIC TIRE.

1,257,857.              Specification of Letters Patent.      Patented Feb. 26, 1918.

Application filed February 1, 1917. Serial No. 145,930.

*To all whom it may concern:*

Be it known that we, WILLIAM G. HAWKINS and JAMES F. DONNELLAN, citizens of the United States, and residents of the city of Chicago, in the county of Cook and State of Illinois, have invented certain new and useful Improvements in an Armored Pneumatic Tire; and we do hereby declare that the following is a full, clear, and exact description of the same, reference being had to the accompanying drawings, and to the numerals of reference marked thereon, which form a part of this specification.

This invention relates to an improved form of an armored vehicle tire wherein an outer spring controlled solid tire bearing rim slidably interfits and is rotated by a chambered armored inner rim which bears upon overlapping spring plates surrounding and resting upon a pneumatic tube disposed within the chambered inner rim of the tire.

It is an object of this invention to construct a vehicle tire wherein an outer rim member is rotated by an inner rim member secured to the felly of a wheel and engaging resilient members mounted within said outer rim member.

It is also an object of this invention to provide a vehicle tire consisting of inner and outer interfitting rims, with the outer rim having spring mechanisms circumferentially disposed therein and adapted to be engaged by bolts secured to said inner rim for rotating the outer rim.

It is a further object of this invention to construct an improved form of resilient tire wherein a pneumatic tube within an inner rim member resiliently supports an outer rim member interfitting therewith, said outer rim member having springs circumferentially disposed therein adapted to be engaged by lateral bolts secured on said inner rim member for transmitting motion from said inner to said outer rim member.

It is furthermore an object of this invention to construct a vehicle tire comprising interfitting metal rims, one of which is provided with a pneumatic tube and the other with a solid bearing tire, said rims being resiliently connected to one another to permit a rotary motion imparted to the pneumatic tube rim to be transmitted to the solid tire rim.

It is further an important object of this invention to provide a vehicle tire comprising spring controlled interfitting armored rims slightly slidable upon one another when one of said rims is being rotated by the other to propel a vehicle.

Other and further important objects of the invention will be apparent from the disclosure in the drawings and specification.

The invention (in a preferred form) is illustrated in the drawings and hereinafter more fully described.

In the drawings:

Figure 1 is a side elevational view of a vehicle wheel equipped with a tire embodying the principles of our invention and having the side cover plate removed.

Fig. 2 is an enlarged detail section taken on line 2—2 of Fig. 1, with the side cover plate in position.

Fig. 3 is an enlarged detail section taken on line 3—3 of Fig. 1, with parts shown in elevation and with the side cover plate bolted in position.

Fig. 4 is a slightly reduced section taken on line 4—4 of Fig. 3, with parts shown in elevation.

Fig. 5 is a fragmentary view of a side portion of the tire partly shown in section and disclosing two of the controlling springs, with a driving bolt compressing one of said springs and with the other extended.

Fig. 6 is a side elevational view of a fragmentary portion of the tire resting on the ground, showing the outer rim fitting into the inner rim and with the side cover plate removed.

Fig. 7 is a reduced fragmentary detail section taken on line 7—7 of Fig. 3, showing the controlling springs slightly compressed in normal position.

Fig. 8 is a fragmentary lateral section through the tire with parts shown in elevation, and with parts broken away to show the construction.

As shown in the drawings:

The reference numeral 1, indicates the hub, the numeral 2, the spokes, and 3, the felly of a vehicle wheel, upon which is mounted an armored pneumatic tire embodying the principles of our invention. Said tire comprises in part an inner metallic rim made up of an inner annular side plate 4, having integrally formed on the inner face thereof a short distance from the inner periphery and at right angles thereto an inner flange or ring 5, of a width equal to the width of the felly 3. Also integrally formed on the inner face of the side plate 4, a short distance above or to the outside of the flange 5, is an outer flange or ring 6, of a width equal to the felly 3, and disposed at right angles to the side plate 4, and concentric with the flange 5, affording a circular groove or annular chamber 7, open at its outer end opposite the side plate 4, to permit a pneumatic inner rubber tube 8, partially surrounded by a protecting strip 9, made of canvas or other suitable material to be removably placed therein, as clearly shown in Figs. 2 and 3.

Mounted within the annular chamber 7, and resting against the canvas covering 9, to hold the same pressed against the outer periphery of the inner tube 8, are a plurality of overlapping arc-shaped plate springs 10, of a width slightly less than the width of the felly 3, said springs being slidably overlapped as denoted by the reference numeral 11, Fig. 4, to prevent pinching of the inner tube 8, and the canvas covering 9. Rigidly secured upon each of the plate springs 10, is a long arc-shaped bearing block 12, the ends of which are inclined toward one another, to permit the block to project outwardly through one of a number of long slots or openings cut or formed in the outer flange 6, for the purpose.

Slidably seated or mounted upon the blocks 12, are a plurality of hollow arc-shaped circumferentially disposed ribs 13, spaced equidistantly from one another affording a space between the adjacent ends thereof. The ribs 13, are integrally formed on the inner periphery of an outer rim 14, the edges of which are curled upwardly and inwardly to form peripheral beads 15, for rigidly clamping and holding a solid rubber tire 16, in position upon the outer rim. Integrally formed at each end of the ribs 13, is an end wall 17, having a central circular opening therein. Also integrally formed within each of said hollow ribs 13, a short distance from each end thereof is an inner or cross wall 18, forming a small chamber 19, in which a spiral spring 20, is longitudinally disposed. Rigidly secured on the outer end of each of the springs 20, is a cylindrical plunger or block 21, which slidably projects through the circular opening in the respective end walls 17, while the inner end of each of said springs rests upon and is secured to a small plate or disk 22, slidably mounted within each of the small chambers 19. For the purpose of regulating the compression of said springs 20, a screw bolt 23, is mounted in each of the chambers 19, and has one end thereof rigidly secured to the disk 22, in the respective chamber, while its other end projects through a suitable opening or aperture in each of the inner walls 18, and is provided on the outer side of the respective inner wall with a lock nut 24, and an angular head 25, adapted to receive a wrench through a suitable slot 26, formed in the bottom of each of said ribs 13.

To hold the tire parts assembled as described, an annular outer retaining plate 27, is removably secured to the felly 3, and to the inner rim plate 4, by means of screw bolts 28, which project laterally through the plate 4, the felly 3, and through the retaining plate 27, as clearly shown in Fig. 3. Driving bolts 29, project laterally through the outer portions of said plates 4 and 27, and each has rotatably engaged thereon between said plates to hold the same properly spaced, a sleeve 30, one of which is disposed laterally between each set of adjacent plungers 21, which contact the same, normally preventing the plungers 21, from being forced out of the small chambers 19, by the springs 20, through the round apertures in the end walls 17.

The operation is as follows:

In assembling the wheel and tire, the annular inner side plate 4, is mounted with its inner surface contacting the inner side of the felly 3, and with the flange 5, fitting around the felly with the free end of the annular flange 5, flush with the outer side of the felly. The blocks 12, and the plate springs 10, are then placed in position with the blocks projecting outwardly through the slots provided for the purpose in the flange 6, and with the plate springs overlapping one another and held pressed against the inner face of the flange 6, by the inner tube 8, and the canvas covering 9, mounted within the annular chamber 7, thus forming a cushion for the outer rim. The outer rim is now placed in position with the ribs 13, contacting the outer faces of the blocks 12. The retaining plate 27, is then clamped in position by the bolts 28, which project through the plate 4, the felly 3, and the plate 27, while the bolts 29, and sleeves 30, are mounted to hold the outer portions of the plates 4 and 27, properly and securely spaced from one another, said sleeves 30, and bolts 29, extending laterally across the tire, one sleeve and bolt disposed between each pair of adjacent plungers 21, thus holding the springs 20, normally in a slightly compressed position within the small chambers 19, to hold the plungers 21, pressed against the sleeve 30.

It will now be noted that if the wheel and tire are mounted upon a vehicle axle in the usual way, that the weight of the vehicle will be supported by the portion of the tire resting upon the ground forcing the ribs 13, against the blocks 12, at that portion of the tire moving the plate springs 10, inwardly against the same, and resiliently supporting the weight of the vehicle, by the telescoping movement of the outer rim into the inner rim of the tire.

If the vehicle engine is now started driving the wheels in a counter-clockwise direction, the inner tire rim and the driving bolts 29, and sleeves 30, which are rigidly secured to the wheels will also rotate therewith, forcing said sleeves and bolts against the plungers 21, located on the side of the bolts in which the wheels are rotated, as shown in Fig. 5, forcing the same inwardly against the action of the springs 20, which in turn transmit the motion through the respective inner cross walls 18, thus rotating the outer rim and tire to move the vehicle. With the driving springs 20, in driving position as shown in Fig. 5, it will be seen that one of the springs 20, is compressed while the other is permitted to expand to force its plunger outwardly.

To regulate the compression of the driving springs 20, the lock nuts 24, are simply loosened and the adjusting bolts 23, are turned the desired amount by a suitable wrench engaging the bolt heads 25, when the side plate 27, is removed permitting access to the adjusting bolts.

We are aware that various details of construction may be varied through a wide range without departing from the principles of this invention, and we therefore do not purpose limiting the patent granted otherwise than necessitated by the scope of the appended claims.

We claim as our invention:—

1. A tire comprising an inner rim, a pneumatic inner tube resting thereon, an outer rim, a solid tread secured thereto, a plurality of spring plates resting on said pneumatic inner tube having their ends overlapped, and a plurality of bearing blocks resting on said plates and supporting the outer rim thereon.

2. A tire comprising an inner rim, a pneumatic inner tube resting thereon, an outer rim, a solid tread element secured thereto, a plurality of spring plates resting on said pneumatic inner tube having their ends overlapped, a plurality of bearing blocks resting on said plates and supporting the outer rim thereon, and a plurality of spring impelled plungers for impelling the outer rim when the inner rim is actuated.

3. A tire comprising an inner annular rim, an inner tube therein, a plurality of resilient members resting on said inner tube, an outer rim, a plurality of members resting on said resilient members and holding the outer rim in yielding relation with the inner rim, said last named members having their ends inclined inwardly.

4. A tire comprising an inner chambered member, an inner tube therein, a transverse annular partition in said member having slots therein, a plurality of spring plates resting on the inner tube and having overlapping ends, an outer rim, and a plurality of blocks spacing the outer rim from the inner tube having their ends shaped to project through the slots to permit relative movement between the outer rim and inner tube.

5. A tire comprising an inner chambered member, an inner tube therein, a transverse annular partition in said member having slots therein, a plurality of spring plates resting on the inner tube and having overlapping ends, an outer rim, a plurality of blocks spacing the outer rim from the inner tube having their ends shaped to project through the slots to permit relative movement between the outer rim and inner tube, a tread member secured to the outer rim, cross walls in said chambered member, plungers in said member, springs bearing at one end against the cross walls and at their other ends against one of the respective plungers, and means separating the plungers and acting as a bearing for adjacent ends of each pair of plungers.

6. A tire comprising a member having an inner rim, and a slotted flange concentric therewith, a pneumatic inner tube secured between said flange and rim, spring plates pressing against said inner tube and bearing against said slotted flange, an outer chambered member having a rim secured thereto and bearing blocks separating the outer rim from the inner rim extending through the slotted flange and resting on the spring plates.

7. A tire comprising a member having an inner rim, and a slotted flange concentric therewith, a pneumatic inner tube secured between said flange and rim, spring plates pressing against said inner tube and bearing against said slotted flange, an outer chambered member having a rim secured thereto, bearing blocks separating the outer rim from the inner rim extending through the slotted flange and resting on the spring plates, a plurality of plungers in said outer chambered member, a plurality of springs bearing against said chambered member and against said plungers, and means against which said plungers bear for rotating the outer member and rim with the inner rim.

8. A tire comprising outer and inner rims, a pneumatic inner tube on the inner rim, a tread element on the outer rim, spring members on the inner tube, separately movable and independently movable members spacing the inner tube and outer tread element apart, and spring controlled positively actuated mechanism for rotating the outer rim from the inner rim.

9. In a tire of the class described the combination with a wheel, of an inner rim secured thereon comprising an inner side plate, annular flanges integrally formed thereon at right angles thereto, one of said flanges having slots longitudinally disposed therein, said flanges affording an annular chamber, a pneumatic tube within said chamber, a canvas protecting covering therearound, overlapping plate springs within said annular chamber between said slotted flange and said canvas covering, a block rigidly secured upon each of said plate springs projecting outwardly through said slots, an outer rim, a solid tire tread secured thereto, hollow ribs integrally formed on the inner peripheral surface of said outer rim adapted to engage said blocks, an outer annular retaining plate bolted to said wheel and to said inner side plate to hold the inner rim parts and the outer rim in position, adjustable spring actuated plungers mounted within said hollow ribs and projecting from the ends thereof to form pairs of adjacently disposed plungers, and driving means secured to said inner side plate and to said retaining plate and disposed between each pair of said plungers adapted to transmit a rotary motion to said outer rim member when said inner rim and said wheel are rotated.

In testimony whereof we have hereunto subscribed our names in the presence of two subscribing witnesses.

WILLIAM G. HAWKINS.
JAMES F. DONNELLAN.

Witnesses:
CHARLES W. HILLS, Jr.,
FRED E. PAESLER.

Copies of this patent may be obtained for five cents each, by addressing the "Commissioner of Patents, Washington, D. C."